United States Patent [19]
Cochran

[11] 3,904,248
[45] Sept. 9, 1975

[54] PROCEDURES FOR RESTART AND SHUTDOWN OF SLURRY PIPELINES

[75] Inventor: Robert A. Cochran, Houston, Tex.

[73] Assignee: Shell Oil Company, Houston, Tex.

[22] Filed: Jan. 6, 1972

[21] Appl. No.: 215,856

[52] U.S. Cl............................ 302/66; 302/14
[51] Int. Cl.................. B65g 53/04; B65g 53/30
[58] Field of Search........................... 302/66, 14

[56] References Cited
UNITED STATES PATENTS
2,920,923  1/1960  Wasp et al.................. 302/66

Primary Examiner—Robert B. Reeves
Assistant Examiner—Hadd Lane
Attorney, Agent, or Firm—Fredrik Marlowe

[57] ABSTRACT

Method for restarting a slurry pipeline by initially pumping only carrier fluid through the pipeline and increasing the flow of the carrier fluid gradually from zero to steady state flow velocity so that the slurry settled bed is completely resuspended by a process of erosion and formation of a slurry plug is avoided.

Method for avoiding the formation of settled bed plugs upon shutdown of a slurry pipeline by gradually slowing the flow in the pipeline until the settled bed can be uniformly distributed along the bottom of the pipeline. Alternatively, the flow can be rapidly slowed to a small percentage of the steady state flow rate after which the lower flow rate is maintained until the settled bed is formed along the pipeline at which time the flow is stopped.

9 Claims, 2 Drawing Figures

PROCEDURES FOR RESTART AND SHUTDOWN OF SLURRY PIPELINES

BACKGROUND OF THE INVENTION

The present invention relates to pipeline transport operations and, more particularly, to a method for avoiding the formation of settled bed plugs by the slurry solid phase material in the pipeline during a shutdown period. In addition, the invention pertains to a method for restarting slurry pipelines and avoiding the formation of plugs in the pipeline.

Transportation by pipeline is a major and growing industry. With the use thereof formerly confined almost entirely to movement of water, gas and petroleum products, pipelines, with the event of slurry transport, have become useful for long and short hauls of a wide variety of raw materials and finished products. With respect to the pipeline transportation of materials in slurry form, problems arise when during a planned or emergency line shutdown, the solids of the transported slurry settle out vertically and completely fill the flow path of the pipeline. Under such conditions when a flow path is not left in the pipeline, restart can very easily cause formation of a slurry plug in the pipeline which may be very difficult to dislodge and move once transport activities are resumed. Accordingly, it is desirable to have a shutdown method which avoids allowing solids to settle out in such a manner as to completely eliminate flow paths in the pipeline and also, where such flow paths are eliminated, to provide a method for restart which avoids the formation of such plugs in the pipelines.

These difficulties are most commonly avoided by emptying the pipeline prior to shutdown. Obviously, this prior art approach is not always feasible or economical, especially in those situations where the pipeline is relatively long so that it is not easily emptied.

Another approach to the restart problem consists of altering the slurry particle size distribution, the slurry solid volume concentration, or in some instances the slurry carrier liquid in such a manner that the slurry settled bed becomes fluid enough to allow ease of startup. It is not certain that this approach will be successful for all slurries, and in addition most often a severe economic penalty is paid to enhance the slurry in this manner.

The present invention overcomes the above described difficulties and provides a successful and economical solution to the problems of the prior art, as will be apparent from the following description thereof.

SUMMARY OF THE INVENTION

The primary purpose of this invention resides in providing a method whereby a slurry pipeline can be restarted while avoiding the formation of slurry plugs therein and reducing restart pressure drop. A further purpose of the invention is to provide a method for shutting down a slurry pipeline which avoids the formation of plugs therein.

The above purposes have been achieved by adjusting the rate of pipeline restart or shutdown in a manner calculated to avoid the formation of plugs therein.

The shutdown method of this invention broadly extends to gradually slowing the flow in a slurry pipeline so that the settled bed is uniformly distributed along the pipeline, whereby the formation of slurry plugs is avoided. Alternatively, the method extends to rapidly slowing the flow rate to a small percentage of the steady state flow rate and then maintaining the lower flow rate until the bed is formed along the pipeline at which time flow is stopped.

The restart method of this invention broadly extends to initially pumping only the carrier fluid through the pipeline and increasing the flow of the carrier fluid gradually from zero to steady state velocity whereby the slurry settled bed is resuspended by a process of erosion and restart pressure drop in the pipeline is reduced.

Within the framework of the above described methods, the present invention not only solves the above mentioned problems of the prior art, but also achieves further significant advantages as will be apparent from the description of preferred embodiments following.

DESCRIPTION OF THE PREFERRED EMBODIMENTS

In accordance with the present invention the restart and shutdown of slurry pipelines is manipulated in a manner to facilitate the avoidance of the formation of slurry plugs in the pipeline. In the case of both shutdown and restart, the method basically involves adjusting flow rate so that a settled bed is either gradually formed to allow a liquid carrier space at the top of the bed or the settled bed is gradually eroded away by an increasing flow rate of liquid carrier.

More specifically, slurry pipeline restart is facilitated by pumping only the carrier fluid through the pipeline initially. The carrier fluid is pumped for a time such that the slurry settled bed is completely resuspended by a process of erosion at which time pumping of the slurry is resumed. By increasing the flow of the carrier fluid gradually from zero to steady state flow velocity over a period of from about 5 minutes to about 2 hours or preferably from about 15 to about 30 minutes, the chance of forming a slurry plug which completely obstructs the flow is reduced and the restart pressure drop in the pipeline increases from zero to the steady state value.

Establishing an initial flow of about 5 to about 10% of the steady state flow is most critical to the restart procedure and as much as 90% of the above mentioned times should be used to establish this initial flow. The increase in flow from the initial flow to the steady state flow can occur more quickly which results in less carrier liquid being needed for restarting the pipeline. For a given slurry the time needed to start the pipeline depends upon the extent to which the pipeline is plugged; the longer times corresponding to situations where only a very small channel exists along the top of the settled bed in the valley sections. By this technique pipeline plugging is prevented, easy slurry pipeline restart is allowed, and start-up of the pipeline is facilitated such that minimum restart pressure is required.

However, slurry pipeline restart difficulties also can be minimized by adjusting the manner in which a slurry pipeline is shutdown. Thus, when flow is instantaneously stopped in the slurry pipeline, settled bed plugs commonly fomr in the valley sections. Such plugs can cause excessive restart pressures.

Figure 1:
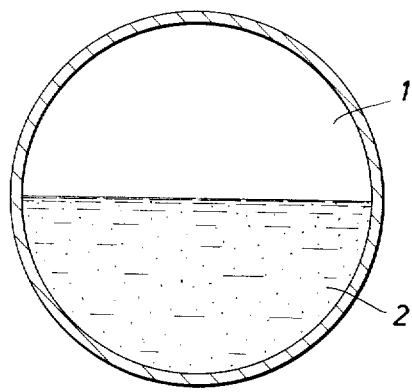
In FIGS. 1 and 2 of the drawings is disclosed the shape of settled beds formed when slurry pipeline shutdown is practiced according to alternative methods of the invention.

In accordance with the invention, by gradually slowing the flow in a slurry pipeline, the settled bed can be uniformly distributed along the pipeline. In valley sections, the bed is uniform and no fully blocked pipe sections are formed. The time for flow shutdown should be equal to or greater than the time needed for the slurry settled bed to form along the pipeline which ranges from about $D/V_x (C_b - C_x/C_x)$ to about $10 D/V_x (C_b - C_x/C_x)$ or preferably from about $2 D/V_x (C_b - C_x/C_x)$ to about $3 D/V_x (C_b - C_x/C_x)$. In the above expressions D is the pipeline diameter, $V_x$ is the slurry settling velocity at the pipeline slurry solid volume concentration, and $C_x$ and $C_b$ are the slurry and slurry settled bed solid volume concentrations, respectively. Stated differently, the flow should be slowed at a rate such that at a given instant of time the bed depth present is approximately equal to the equilibrium bed depth at that velocity. Using this shutdown technique, restart may easily be facilitated by erosion of the settled bed. A typical settled bed cross-section in a valley section is shown in FIG. 1 for a slurry having a settled bed concentration approximately twice the suspended slurry concentration. Shutdown in the above described manner results in approximately half of the pipeline space containing carrier liquid 1 while the settled bed 2 occupies the lower half of the pipeline.

Figure 2:
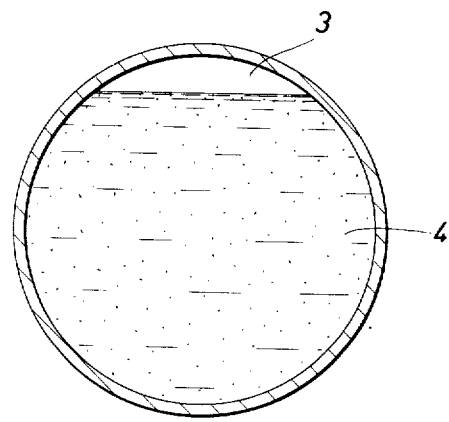

An alternate technique for shutdown involves rapidly slowing the flow to a small percentage of the steady state flow rate, for example about 10% or within a range of from about 5 to about 15%, over a time period of from about $D/V_x (C_b - C_x/C_x)$ to about $10 D/V_x (C_b - C_x/C_x)$ or preferably from about $2 D/V_x (C_b - C_x/C_x)$ to about $3 D/V_x (C_b - C_x/C_x)$. This lower flow rate is maintained until the bed is formed along the pipeline at which time the flow is stopped. This procedure for pipeline shutdown, as compared with the previous procedure requires that less carrier fluid be pumped into the pipeline during shutdown, but maintains a channel along the top of the entire pipeline. Alos, this procedure does not result in a uniform deposition of material along the pipeline. A larger percent of the pipe cross-section is blocked in the valley. However, the procedure does prevent the formation of a slurry plug which completely blocks the pipeline. As with the first method of pipeline shutdown, restart easily occurs by erosion of the settled bed. A typical settled bed cross-section in a valley section is shown in FIG. 2 of the drawings wherein a small carrier liquid space 3 is maintained above a larger settled bed 4, as compared with the first embodiment of pipeline shutdown described above.

For both procedures for pipeline shutdown and restart, the carrier liquid should be pumped into the pipeline during the transient period when the settled bed is being deposited or eroded. Once the settled bed is fully suspended during restart, pumping of the slurry into the pipeline can be resumed. For both procedures of pipeline shutdown it is necessary that the angles of pipeline inclination be less than the critical sliding angle at which the settled bed will slide along the pipeline.

I claim as my invention:

1. A method for shutting down a slurry pipeline having valley sections and avoiding settled bed plugs in the valley sections, the slurry comprising a liquid phase and a solid phase and said method comprising the step of: gradually slowing the flow in the slurry pipeline so that the settled bed which forms is uniformly distributed along the entire length of the pipeline wherein flow shutdown time ranges from about $$\frac{D}{V_x} \left(\frac{C_b - C_x}{C_x}\right) \text{ to about } 10 \frac{D}{V_x} \left(\frac{C_b - C_x}{C_x}\right)$$

where D is the pipeline diameter, $V_x$ is the slurry settling velocity at the pipeline slurry solid volume concentration, $C_x$ is the slurry solid volume concentration, and $C_b$ is the slurry settled bed solid volume concentration.

2. The method of claim 1 wherein the time for flow slow down is at least equal to the time needed for the slurry settled bed to form along the pipeline.

3. The method of claim 1 wherein the flow is slowed at a rate such that at a given instance of time the bed depth present is approximately equal to the equilibrium bed depth at that velocity.

4. The method of claim 1 wherein flow shutdown time ranges from about $$2 \frac{D}{V_x} \left(\frac{C_b - C_x}{C_x}\right) \text{ to about } 3 \frac{D}{V_x} \left(\frac{C_b - C_x}{C_x}\right)$$

wherein D is the pipeline diameter, $V_x$ is the slurry settling velocity at the pipeline slurry solid volume concentration, $C_x$ is the slurry solid volume concentration, and $C_b$ is the slurry settled bed solid volume concentration.

5. A method for shutting down a slurry pipeline having valley sections which avoids the formation of settled bed plugs in the valley sections of the pipeline, said slurry comprising a liquid phase and a solid phase and said method comprising the steps of:

rapidly slowing the flow to a small percentage of steady state flow rate in the pipeline wherein flow is rapidly slowed to about 5% to about 15% of steady state flow rate over a time period of from about $$\frac{D}{V_x} \left(\frac{C_b - C_x}{C_x}\right) \text{ to about } 10 \frac{D}{V_x} \left(\frac{C_b - C_x}{C_x}\right)$$

wherein D is the pipeline diameter, $V_x$ is the slurry settling velocity at the pipeline slurry solid volume concentration, $C_x$ is the slurry solid volume concentration, and $C_b$ is the slurry settled bed solid volume concentration, maintaining the lower flow rate until the bed is evenly formed along the entire length of pipeline, and stopping flow in the pipeline.

6. The method of claim 5 wherein flow is rapidly slowed to about 10% of steady state flow rate.

7. The method of claim 5 wherein flow is rapidly slowed to from about 5% to about 15% of steady state flow rate over a time period of from about $$2 \frac{D}{V_x} \left(\frac{C_b - C_x}{C_x}\right) \text{ to about } 3 \frac{D}{V_x} \left(\frac{C_b - C_x}{C_x}\right)$$

wherein D is the pipeline diameter, $V_s$ is the slurry settling velocity at the pipeline slurry solid volume concentration, $C_s$ is the slurry solid volume concentration, and $C_b$ is the slurry settled bed solid volume concentration.

8. A method for shutting down and restarting a slurry pipeline having valley sections which avoid formation of settled bed plugs in the valley sections, the slurry comprising a liquid phase and a solid phase and the method comprising the steps of:

gradually slowing the flow in the slurry pipeline until the pipeline is shutdown, whereby the settled bed which forms is uniformly distributed along the entire length of the pipeline and wherein flow shutdown time ranges from about $$\frac{D}{V_s} \left(\frac{C_b - C_s}{C_s}\right) \text{ to about } 10 \frac{D}{V_s} \left(\frac{C_b - C_s}{C_s}\right)$$

wherein D is the pipeline diameter, $V_s$ is the slurry settling velocity at the pipeline slurry solid volume concentration, $C_s$ is the slurry solid volume concentration, and $C_b$ is the slurry settled bed solid volume concentration, and restarting the pipeline by initially pumping only the carrier fluid through the pipeline and increasing the flow of the carrier fluid gradually from zero to steady state velocity over a period of time such that the slurry settled bed is completely resuspended by a process of erosion and restart pressure in the pipeline is reduced.

9. A method for shutting down and restarting a slurry pipeline having valley sections which avoids formation of settled bed plugs in the valley sections, the slurry comprising a liquid phase and a solid and a solid phase and the method comprising the steps of:

rapidly slowing the flow to a small percentage of steady state flow in the pipeline, wherein flow is rapidly slowed to about 5% to about 15% of steady state flow rate over a time period of from about $$\frac{D}{V_s} \left(\frac{C_b - C_s}{C_s}\right) \text{ to about } 10 \frac{D}{V_s} \left(\frac{C_b - C_s}{C_s}\right)$$

wherein D is the pipeline diameter, $V_s$ is the slurry settling velocity at the pipeline slurry solid volume concentration, $C_s$ is the slurry solid volume concentration, and $C_b$ is the slurry settled bed solid volume concentration, maintaining the lower flow rate until the bed is formed along the pipeline, stopping flow in the pipeline, whereby the settled bed which forms is uniformly distributed along the pipeline, and restarting the pipeline by initially pumping only the carrier fluid through the pipeline and increasing the flow of the carrier fluid gradually from zero to steady state velocity, whereby the slurry bed is completely resuspended.

* * * * *